Oct. 8, 1957 G. A. LYON 2,808,908
WHEEL STRUCTURE WITH BRAKE DRUM COOLING MEANS
Filed Sept. 3, 1954 2 Sheets-Sheet 1

Inventor
GEORGE ALBERT LYON
By Hill, Sherman, Meroni, Gross & Simpson Attys.

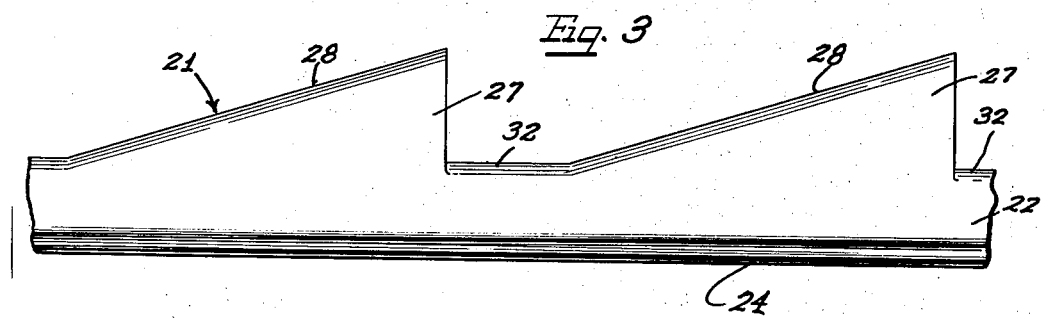
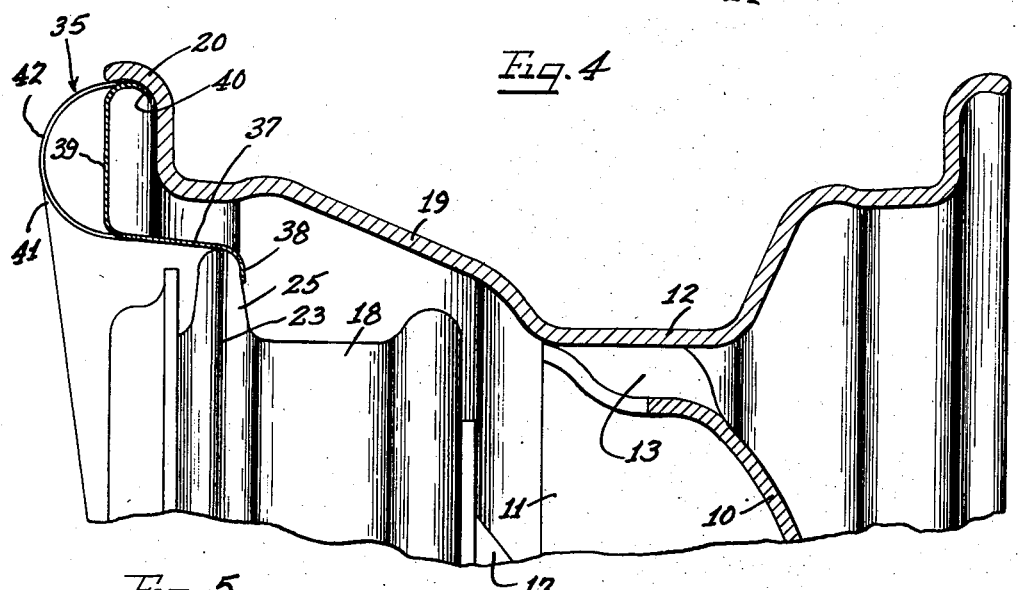
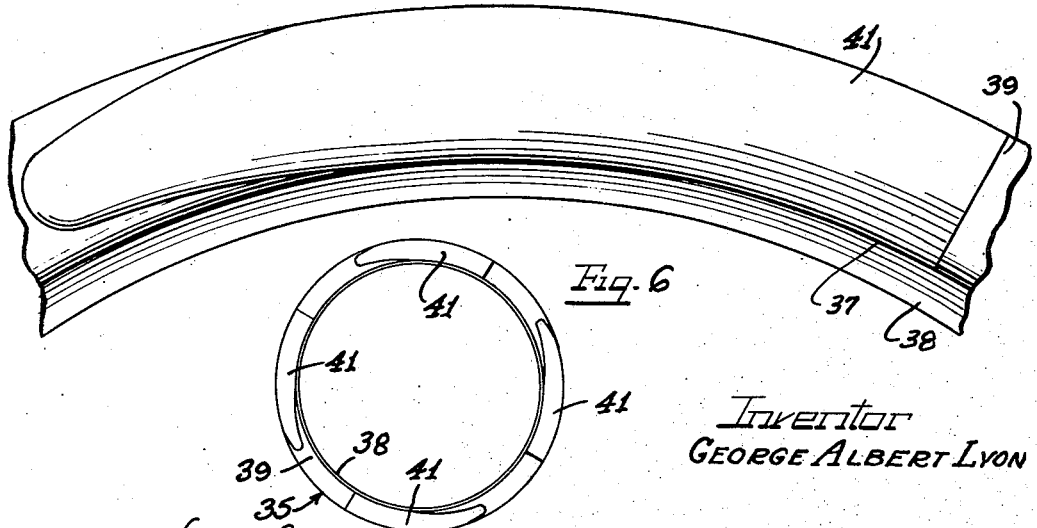
Inventor
GEORGE ALBERT LYON

United States Patent Office 2,808,908
Patented Oct. 8, 1957

2,808,908

WHEEL STRUCTURE WITH BRAKE DRUM COOLING MEANS

George Albert Lyon, Detroit, Mich.

Application September 3, 1954, Serial No. 454,003

9 Claims. (Cl. 188—264)

The present invention relates to improvements in wheel structures and more particularly concerns a novel expedient for cooling the brake drums of vehicle wheels.

As a result of increased automobile weights and driving speeds, coupled with enlarged sizes of tires and thus smaller diameters of wheels, a growing problem is created in the danger of overheating of the brakes which of necessity must also be larger and more powerful in their construction and operation. Such overheating of the brakes will arise where insufficient cooling air moves in contact with the brake drum during running of the vehicle.

It is therefore an object of the invention to provide a wheel structure having improved means for promoting the circulation of cooling air about a brake drum with which the wheel is associated.

Another object of the invention is to provide an improved brake drum cooling device for application to a vehicle wheel.

A further object of the invention is to provide improved brake drum cooling means adapted to be provided as a one-piece sheet metal fabrication.

Still another object of the invention is to provide a brake drum cooling ring device having a high power blower effect in service.

Other objects, features and advantages of the present invention will be readily apparent from the following detailed description of certain preferred embodiments thereof taken in conjunction with the accompanying drawings, in which:

Figure 3 is a fragmentary inside elevational view of the cooling ring;

Figure 4 is a fragmentary radial sectional view, partially in elevation, through a wheel structure showing a modification of the brake drum cooling ring;

Figure 5 is a fragmentary inside elevational view of the cooling ring of Figure 4; and Figure 6 is a small scale full rear elevational view of the cooling ring of Figures 4 and 5.

Figure 1:
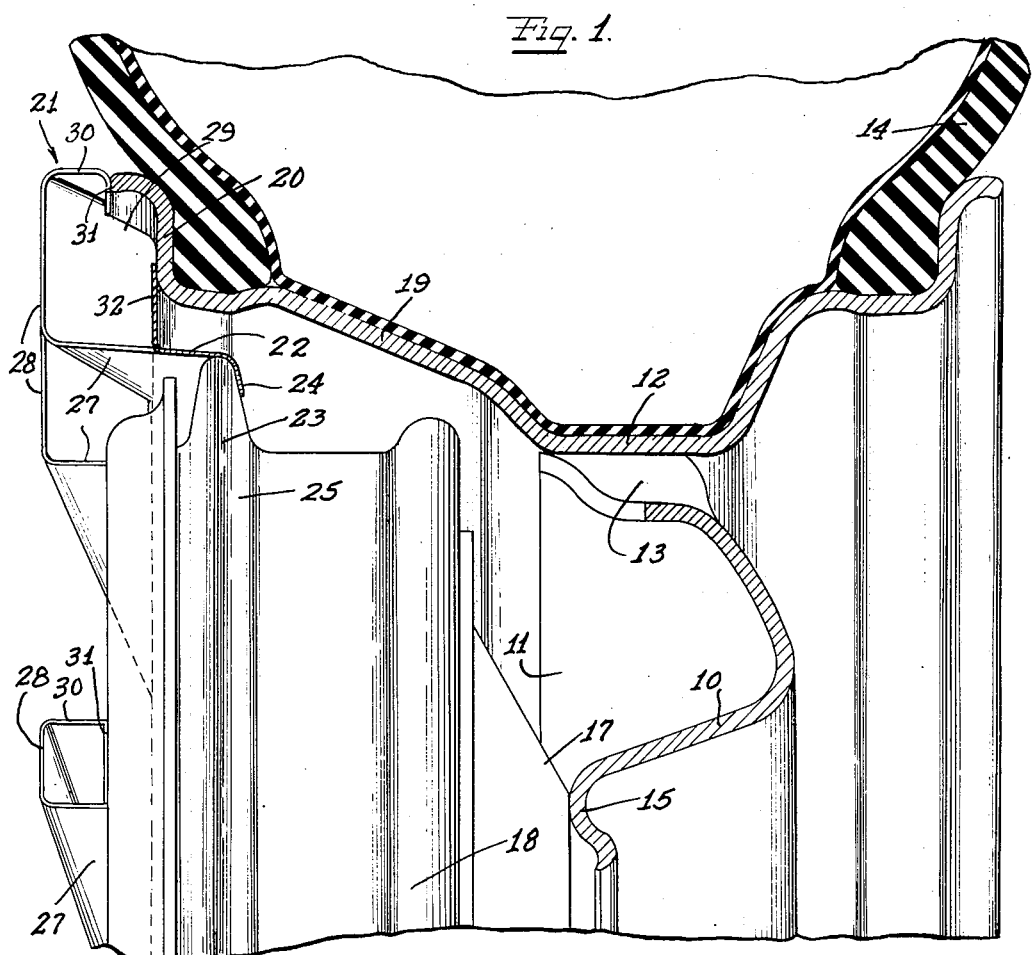
Figure 1 is a fragmentary radial sectional view through a wheel structure, partially in elevation, showing one form of the present invention.

A wheel with which the present invention is adapted to be used comprises a disc spider body 10 having an outer radial marginal generally axially inwardly extending attachment flange 11 secured in suitable manner to a base flange 12 of a tire rim and preferably inset at a suitable number of places such as 3 or 4 to provide air circulation openings 13 through the wheel. The tire rim is of the multi-flange, drop center type adapted to support a pneumatic tire and tube assembly 14, or a tubeless tire, as preferred.

At its center, the wheel body 10 has a bolt-on flange 15 adapted to be secured as by means of attachment bolts (not shown) to a flange structure 17 associated with a vehicle axle and carrying a brake drum 18.

In order to accommodate a tire of large size, the tire rim is provided at its inner side with a substantially elongated generally axially inwardly and radially outwardly sloping flange 19 of substantial width terminating in a generally radially outwardly and then axially outwardly turned terminal flange 20, and defining about the brake drum 18 a gap through which air may circulate about the brake drum and through the wheel openings 13. However, the gap between the tire rim and the brake drum is of fairly restricted dimensions and the brake drum is substantially entirely encircled by the tire rim so that in operation of the vehicle when the wheel is operating at high speed, insufficient air circulation through the air gap results in overheating of the brake within the drum 18.

According to the present invention improved cooling ring means 21 are provided in association with the brake drum 18 and the tire rim and more particularly the inner terminal flange 20 thereof for promoting circulation of air outwardly through the gap between the brake drum and the tire rim in the operation of the wheel. By preference, the brake drum cooling ring 21 is made from sheet metal of suitable character, either as a stamping or as a rolled section, or as a combination stamped and rolled fabrication.

A tubular ring body 22 comprises the base structure of the brake drum cooling ring and is of a diameter to fit fairly closely though preferably relatively axially slidably over an annular radially outwardly projecting rib 23 at the axially inner margin of the brake drum 18. For defining the axially inner limit of the ring member a generally radially inwardly directed outer marginal flange 24 on the body 22 is engageable with the axially outer side of the rib 23 defining a generally axially outwardly facing shoulder 25. Thus, the brake drum cooling ring is adapted to be applied to the brake drum by sliding the same into position from the axially outer side of the brake drum until the stop flange 24 comes to rest against the shoulder 25.

In the present instance, the ring body 22 is of fairly narrow dimension predetermined to be approximately equal to the width of the axial space or offset between the ridge of the rib 23 of the brake drum and the radially extending portion of the terminal flange 20. Formed as integral extensions in one piece from the axially inner margin of the body 22 is a series of equally spaced air scoops 27. Each of the air scoops has a radially inner side wall that extends in a common plane both axially and circumferentially with the ring body 22 and merges with a radially outwardly extending and axially facing scoop wall 28 of a width to overlie completely the terminal flange 20 in substantial spaced relation. The scoop wall as best seen in Figures 1 and 3, slopes from the open mouth of each of the air scoops in a generally axially outwardly and circumferential direction to a trailing end portion 29 (Figs. 1 and 2) of a width to fit inside the axially extending extremity portion of the terminal flange 20 into engagement with the radially extending portion of the terminal flange. In that portion of the scoop wall 28 that projects axially inwardly beyond the tip of the terminal flange 20, an axially outwardly directed radially outer side wall flange portion 30 is provided having a radially inwardly turned marginal finishing and reinforcing flange 31 arranged to seat against the tip of the terminal flange. Through this arrangement, each of the scoops 27 cooperates with and utilizes the terminal flange 20 as a part of the completed scoop so that in the rotation of the cooling ring with the wheel, air scooped into the several scoops 27 will be directed axially outwardly into the gap space between tire rim flange 19 and the brake drum 18. Since the gap opening between the ring body 22 and the adjacent portion of the tire rim is of smaller cross sectional area than the substantial air gathering space within the chamber provided by the several scoops 27 and the terminal flange 20, there will be a substantially venturi-like compression of the air and an increase in velocity of the air as it expands into the larger space within the gap between the tire rim and the brake drum proper, thus enhancing circulatory movement of air past the brake drum and eventually out through the wheel openings 13.

Figure 2:
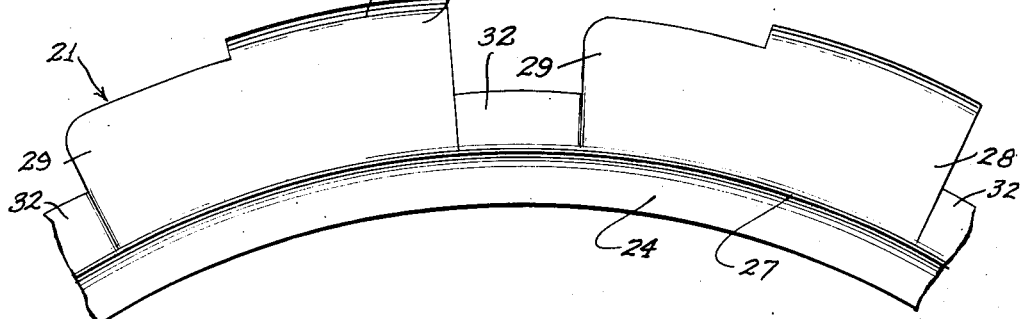
Figure 2 is a fragmentary rear elevational view of the brake drum cooling ring of Figure 1.

Since for most efficient operation it is desirable to have the air scoops 27 spaced substantially circumferentially about the ring, so that between the tail ends of the scoop walls 28 and the mouths of the adjacent scoops there is a substantial gap as visualized in Fig. 2, a covering extension 32 is preferably provided from the terminal portion 29 of the scoop wall to overlie and close the gap rearwardly from the scoop between the ring body 22 and the tire rim, substantially to the mouth of the succeeding scoop in the series. This avoids escape of air from within the ring and reduces to a minimum internal turbulences in the operation of the ring.

It will be clear, of course, that the engagement afforded with the terminal flange 20 by the edge flange 31 and the tail portions 29 and 32 of the scoops retains the ring member 21 against axially outward displacement in the assembly. By preference, the spacing relationship between the axially outer marginal flange 24 and the terminal flange engaging portions of the ring is such that after the wheel has been bolted onto the flange member 17, the brake drum cooling ring member 21 is held under substantial resilient tension on the wheel, against rattling or circumferential turning or shifting due to torque stresses. It will be appreciated, of course, that a tendency toward reverse turning of the ring in service is substantially resisted by engagement of the edges of the tail portions 29 of the scoop walls with the terminal flange.

In the modification of Figures 4, 5 and 6, the wheel itself is of the same structure as that shown in Figure 1 and therefore the same reference numerals are applied thereto to designate the same parts. In this form of the invention, a brake drum cooling ring 35 is provided which is preferably made as a single or one-piece metal member, preferably stamped or rolled from a piece of sheet metal. In this form, the ring comprises a generally tubular body 37 having at its axially inner margin a generally radially inwardly turned annular flange 38 for retainingly engaging the brake drum rib shoulder 25 while the body 37 cooperates with the opposing portion of the tire rim to define a narrow gap leading into the larger space within the gap between the brake drum proper and tire rim flange 19.

In the air cooling ring 35, the body 37 extends generally axially outwardly to a width substantially equal to the width between the ridge of the rib 23 and the tip of the terminal flange 20. Thence the body of the ring extends generally radially outwardly to provide a terminal flange covering or overlying portion 39 spaced from the radially extending portion of the terminal flange 20 and terminating in a turned generally axially outwardly directed annular tire rim engaging flange 40 generally complementary to and adapted to nest within the curve of the terminal flange. The construction and relationship is such that in full assembly, the tire rim terminal flange 20 thrusts against the ring flange 40 to thereby place the ring under resilient tension which draws the retaining flange 38 snugly against the brake drum rib 23.

For scooping air into the ring 35, the inner portion 39 of the ring is provided with a plurality of pressed out circumferentially tapering elongated air scoops 41. Herein four of the scoops 41 are shown (Fig. 6), although it will be appreciated that a larger or smaller number of the air scoops may be provided. It will be observed that each of the air scoops 41 has a mouth portion 42 that is substantially spaced from the main portion of the inner wall 39 of the ring. Through this construction, similarly as in the brake drum cooling ring 21, the air scoops cooperate with the terminal flange 20 of the tire rim to capture air and drive the same from the chamber afforded within the ring in cooperation with the terminal flange through the narrow substantially venturi gap between the ring body 37 and the tire rim into the larger space axially outwardly therefrom and thus into cooling relation about the brake drum 18 and thence to exhaust through the wheel openings 13.

Inasmuch as the cooling rings 21 and 35 are of resilient structure and are intimately in engagement with the brake drum 18 and are held under resilient tensioned engagement between the brake drum and the tire rim, substantially vibration dampening is afforded by the cooling rings to dissipate audible frequency vibrations that may be produced in the brake drum as an incident to operation of the brakes, as sometimes occurs in spite of the best practical manufacturing controls.

It will be understood that modifications and variations may be effected without departing from the scope of the novel concepts of the present invention.

I claim as my invention:

1. In a wheel structure including a tire rim and a brake drum, an air circulation promoting ring assembled with the tire rim and the brake drum and having a plurality of circumferentially elongated air scoops with radially inner sides spaced radially inwardly relative to the tire rim and radially outer sides overlying the tire rim and cooperating with the tire rim to provide a plurality of individual air chambers into which air is scooped for circulation in cooling relation about the brake drum.

2. In a wheel structure including a tire rim and a brake drum, the tire rim having a terminal flange, an air circulation promoting ring assembled with the tire rim and the brake drum and having a plurality of circumferentially elongated air scoops with radially inner sides spaced radially inwardly relative to the tire rim and radially outer sides overlying the tire rim and cooperating with the tire rim to provide an air chamber into which air is scooped for circulation in cooling relation about the brake drum, said air scoops having tail portions engaging with the terminal flange of the tire rim.

3. In a wheel structure including a tire rim and a brake drum, the tire rim having a terminal flange, an air circulation promoting ring assembled with the tire rim and the brake drum and having a plurality of circumferentially elongated air scoops with radially inner sides spaced radially inwardly relative to the tire rim and radially outer sides overlying the tire rim and cooperating with the tire rim to provide an air chamber into which air is scooped for circulation in cooling relation about the brake drum, said air scoops having means at their radially outer sides engaging in tensioned retaining abutment with the terminal flange of the tire rim.

4. In a wheel structure including a brake drum and a tire rim disposed in air gap relationship about the brake drum, the tire rim having a terminal flange with a tip extremity, an air scoop ring member having a tubular radially inner wall retainingly engaged about the axially inner portion of the brake drum and extending axially inwardly therebeyond, said tubular wall having air scoop wall structure extending radially outwardly into overlying relation with the tip extremity of the terminal flange of the tire rim and cooperating therewith in fully closing relation to the air gap between the tire rim and the brake drum, with air scoop openings directed in the direction of rotation of the wheel.

5. In a brake drum cooling ring structure for disposition across the gap of a wheel structure between the brake drum and a multi-flange tire rim thereof and wherein the tire rim has a terminal flange, a generally tubular ring body having means at its axially outer margin for retaining engagement with a brake drum and provided with generally radially outwardly and then axially outwardly directed structure for overlying a tire rim and having a circumferential series of elongated circumferentially curved and tapering air scoops spaced substantially apart and providing substantial air scoop mouths and circumferentially and axially outward oblique air scoop walls, said air scoop walls having tail portions engageable with the terminal flange of the tire rim.

6. In a brake drum cooling ring structure for disposition across the gap of a wheel structure between the brake drum and a multi-flange tire rim thereof and wherein the tire rim has a terminal flange, a generally tubular ring body having means at its axially outer margin for retaining engagement with a brake drum and provided with generally radially outwardly and then axially outwardly directed structure for overlying a tire rim and having a circumferential series of elongated circumferentially curved and tapering air scoops spaced substantially apart and providing substantial air scoop mouths and circumferentially and axially outward oblique air scoop walls, said air scoop walls having radially outer wall portions directed generally axially outwardly and cooperable with the terminal flange tip of the tire rim and in addition tail portions engageable with an axially inwardly facing portion of the terminal flange.

7. In an air circulation promoting ring member for engagement over the gap between the inner side of a tire rim and a brake drum about which the tire rim is disposed, said ring comprising an axially elongated annular tubular wall member having means at its axially outer end for engagement with the brake drum and having a generally radially outwardly and then axially outwardly directed wall portion for overlying and retainingly engaging with a terminal flange of the tire rim, said radially outwardly extending portion having pressed therefrom a series of circumferentially spaced axially inwardly projecting circumferentially elongated air scoops with the mouths thereof extending substantially axially inwardly from said radially extending portion, each of said air scoops occupying a substantially segmental arc portion of the ring and being curved circumferentially to follow the ring curvature.

8. In a wheel structure including a tire rim encircling a brake drum in air gap relation, an air cooling ring for substantially closing said gap, and having a series of circumferentially directed air scoops provided with tail flanges engaging the tire rim and retaining the ring against turning on the wheel in service.

9. In a brake drum cooling ring structure a tubular ring body having a wall extending generally axially and provided at uniform intervals with air motivating louver extension portions projecting from and providing portions of one margin of the body, said louver extension portions having radially turned and generally axially facing louver wall portions projecting substantially radially away from said body wall and then turned generally axially in the opposite direction from the body wall marginal extension portions of the louvers, said louver wall portions being angled to provide louver mouths at one of the circumferentially directed ends thereof.

References Cited in the file of this patent
UNITED STATES PATENTS

| | | |
|---|---|---|
| 2,143,950 | Kliesrath | Jan. 17, 1939 |
| 2,659,459 | Lyon | Nov. 17, 1953 |
| 2,659,460 | Lyon | Nov. 17, 1953 |